United States Patent
Ochs et al.

(10) Patent No.: US 9,762,173 B2
(45) Date of Patent: Sep. 12, 2017

(54) METHOD AND APPARATUS TO CONTROL AN INVERTER

(71) Applicant: GM GLOBAL TECHNOLOGY OPERATIONS LLC, Detroit, MI (US)

(72) Inventors: David S Ochs, Troy, MI (US); Brian A Welchko, Oakland, MI (US); Alexander K. Rustoni, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 14/811,094

(22) Filed: Jul. 28, 2015

(65) Prior Publication Data

US 2017/0033722 A1 Feb. 2, 2017

(51) Int. Cl.
*H02P 1/00* (2006.01)
*H02P 27/08* (2006.01)
*H02M 7/537* (2006.01)
*B60K 1/00* (2006.01)
*H02P 29/60* (2016.01)

(52) U.S. Cl.
CPC .............. *H02P 27/085* (2013.01); *B60K 1/00* (2013.01); *H02M 7/537* (2013.01); *H02P 29/60* (2016.02)

(58) Field of Classification Search
CPC B60L 3/003; B60L 3/06; B60L 15/08; B60W 10/08
USPC ................. 318/799, 800, 801, 139, 599, 811
See application file for complete search history.

(56) References Cited

U.S. PATENT DOCUMENTS

| | | | | |
|---|---|---|---|---|
| 6,523,361 | B2* | 2/2003 | Higashiyama | B60H 1/3222 62/183 |
| 7,679,310 | B2* | 3/2010 | Schulz | B60L 15/08 318/799 |
| 8,030,863 | B2* | 10/2011 | Yoshida | B60K 1/00 318/400.01 |
| 2009/0072770 | A1* | 3/2009 | Son | B60L 3/06 318/139 |
| 2012/0112674 | A1 | 5/2012 | Schulz et al. | |
| 2014/0027089 | A1* | 1/2014 | Hisada | B60L 3/003 165/11.1 |
| 2015/0155812 | A1 | 6/2015 | Jang et al. | |

* cited by examiner

*Primary Examiner* — Rina Duda
(74) *Attorney, Agent, or Firm* — Quinn IP Law

(57) ABSTRACT

An inverter electrically connected to an electric machine is described. A method for controlling switching in the inverter includes determining a torque output of the electric machine and determining a temperature related to an inverter cooling circuit. A preferred inverter switch control mode for controlling the inverter is selected based upon the torque output of the electric machine and the temperature related to the inverter cooling circuit.

10 Claims, 3 Drawing Sheets

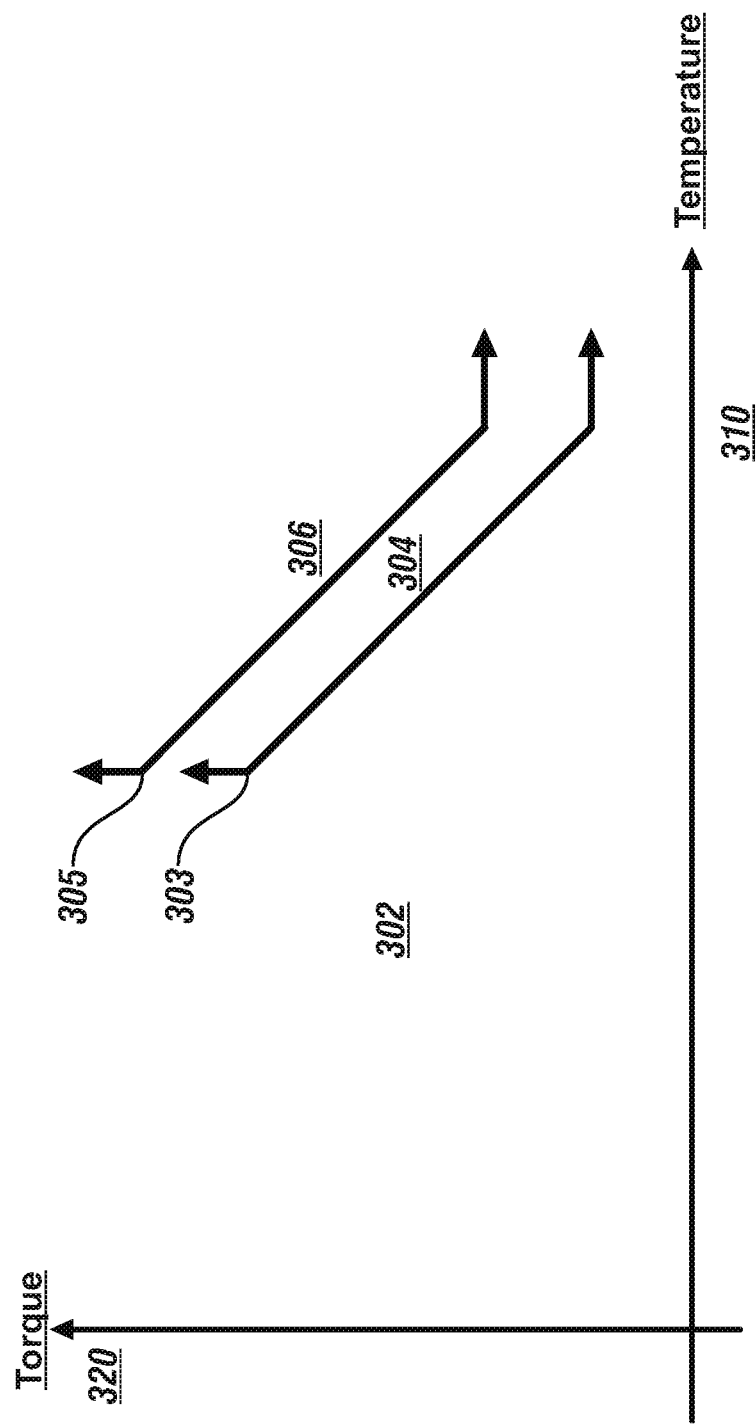

METHOD AND APPARATUS TO CONTROL AN INVERTER

TECHNICAL FIELD

This disclosure relates to high-voltage electric power systems employed on vehicles, and control routines related thereto.

BACKGROUND

Vehicles may employ powertrain systems that generate propulsion power from an internal combustion engine (engine) in conjunction with a non-combustion motor such as a high-voltage electric motor/generator. The high-voltage electric motor/generator(s) draw electric power from an on-vehicle high-voltage electric energy storage device, e.g., a high-voltage battery, via a high-voltage electric power circuit that includes an inverter. An inverter is a device that converts a DC input voltage to an AC output voltage employing a plurality of semiconductor switches arranged in pairs. The paired semiconductor switches are controlled according to an inverter switch control mode. The AC output voltage may be supplied to an electric machine such as a high-voltage electric motor/generator to accomplish work, wherein the work may include generating torque in a torque mode or generating electric power in a reactive mode. The semiconductor switches may be IGBTs, FETs or other suitable devices. Switching techniques for controlling the semiconductor switches include pulsewidth-modulation (PWM) methods, such as a triangular comparison PWM, a space vector (SV) PWM method (SV-PWM), and a discontinuous PWM (D-PWM) method. The different switching techniques yield different results in terms of control, power loss, noise, harmonic content and other parameters. Power loss affects system efficiency and system thermal generation.

SUMMARY

An inverter electrically connected to an electric machine is described. A method for controlling switching in the inverter includes determining a torque output of the electric machine and determining a temperature related to an inverter cooling circuit. A preferred inverter switch control mode for controlling the inverter is selected based upon the torque output of the electric machine and the temperature related to the inverter cooling circuit.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 3 graphically shows a calibration for a variable Z to select a preferred inverter switch control mode in relation to coolant temperature and motor torque, in accordance with the disclosure.

DETAILED DESCRIPTION

Figure 1:
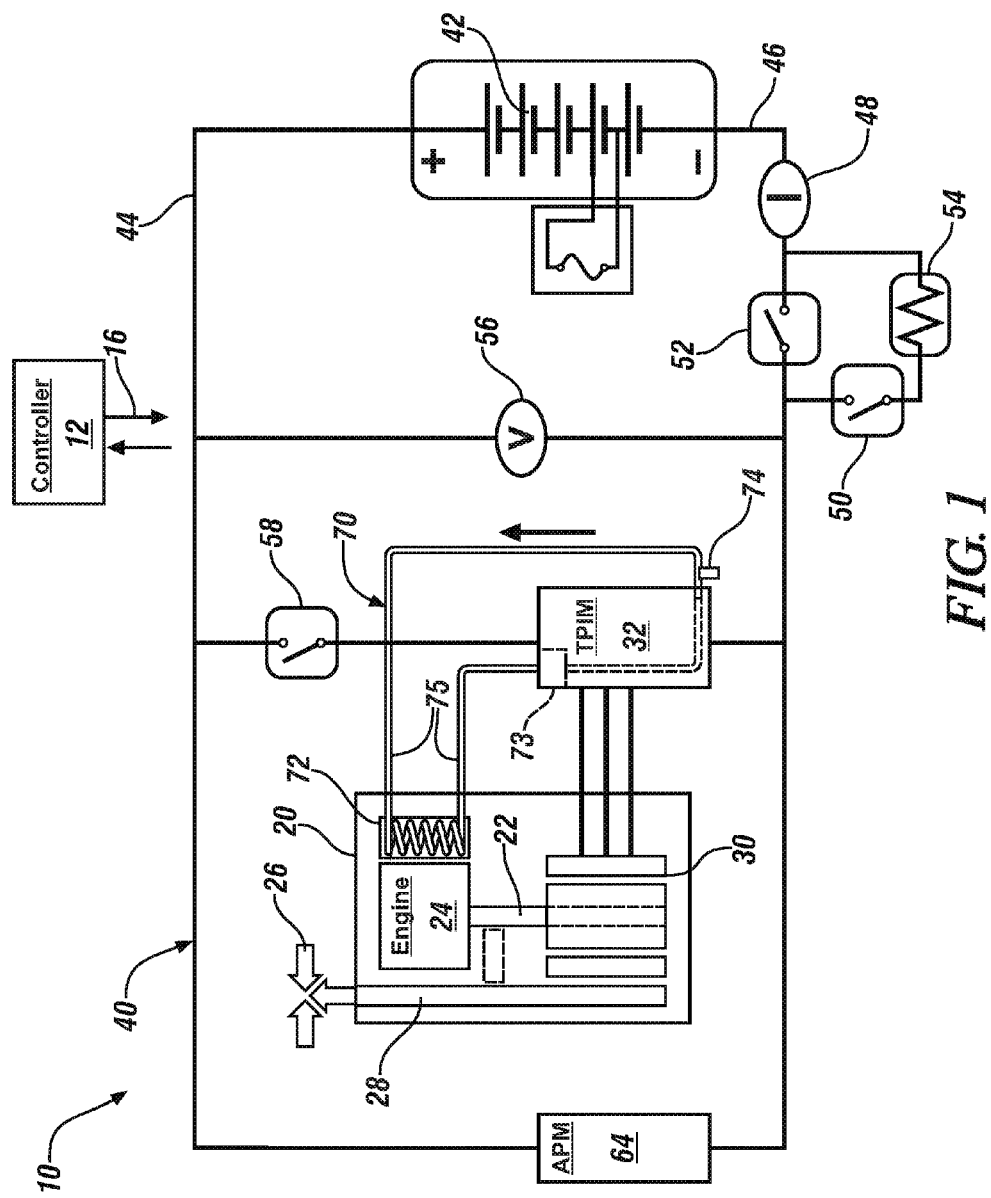
FIG. 1 schematically illustrates an embodiment of a high-voltage electric power system that is controlled by a controller, including the high-voltage electric power system employed on a powertrain system of a vehicle, in accordance with the disclosure.

Referring now to the drawings, wherein the depictions are for the purpose of illustrating certain exemplary embodiments only and not for the purpose of limiting the same, FIG. 1 schematically illustrates a high-voltage electric power system 40 that is controlled by a controller 12. In one non-limiting embodiment, and as shown, the high-voltage electric power system 40 is employed on a powertrain system 20 of a vehicle 10.

The powertrain system 20 includes in one non-limiting embodiment an internal combustion engine (engine) 24 mechanically coupled to an electric machine 30 and a geartrain 28 that mechanically couples to a vehicle driveline 26 to supply propulsion power to one or a plurality of vehicle wheels. The engine 24 may be any suitable internal combustion engine that converts hydrocarbon-based or other fuel to mechanical power through combustion processes. The engine 24 mechanically rotatably couples to the electric machine 30 using a rotatable member 22 of the geartrain 28 or another suitable mechanical coupling. The powertrain system 20 may employ a second or more electric machines for vehicle propulsion and other functions. The geartrain 28 may include any suitable mechanical power transfer mechanisms, such as planetary gears, helical gears and other gearsets, rotating shafts, clutches, brakes and other devices without limitation. The rotatable member 22 may include any suitable form such as a rotating shaft, a meshed gear arrangement, or a belt-drive arrangement, by way of non-limiting examples. Alternatively, the rotatable member 22 may include mechanical coupling to the engine 24 via a ring gear, carrier gear or sun gear of a planetary gearset of one embodiment of the geartrain 28 of the powertrain system 20. Other details of embodiments of mechanical interconnections between the engine 24, the electric machine 30 and the gear train 28 are known and not described in detail.

The electric machine 30 may be any suitable electric machine, and in one embodiment is a high-voltage electric motor/generator that converts high-voltage electric power to mechanical power and preferably converts mechanical power to electric energy that may be stored in a high-voltage energy storage device (high-voltage battery) 42. The electric machine 30 electrically connects to a power inverter module (TPIM) 32. Torque output from the electric machine 30 may be monitored, either directly using a torque sensor, or may be inferred from monitored inputs to the electric machine 30 such as electric current, flux or other parameters.

The high-voltage battery 42 supplies electric power via a high-voltage bus to electric power components, specifically the TPIM 32 via a contactor switch 58. The high-voltage bus includes a positive side (HV+) 44 and a negative side (HV−) 46, with electric power monitored by a current sensor 48 and a voltage sensor 56. The electric power components preferably include the TPIM 32 and an auxiliary power module (APM) 64. In one embodiment, an AC charger electrically couples to the high-voltage bus and is electrically connectable via a charging cable to a remote, off-vehicle AC electric power source to electrically charge the high-voltage battery 42 while the vehicle 10 is stationary. The high-voltage battery 42 may be any suitable high-voltage energy storage device, e.g., a multi-cell lithium ion device, an ultracapacitor, or another device without limitation. A negative bus contactor switch 52 connects HV− 46 to the high-voltage battery 42, and a pre-charge contactor switch 50 with a resistor 54 are arranged in parallel therewith. The APM 64 and the AC charger are preferably arranged in parallel between HV+ 44 and HV− 46. The APM 64 preferably includes a DC/DC electric power converter that electrically connects to a low-voltage bus and a low-voltage battery in one embodiment. The APM 64 provides low-voltage electric power to low-voltage systems on the vehicle, including, e.g., electric windows, HVAC fans, seats, and other accessory devices.

An inverter cooling circuit 70 is arranged to manage and transfer heat generated by the TPIM 32. The inverter cooling circuit 70 includes an air/fluid heat exchanger 72 that fluidly connects to a heat sink element 73 of the TPIM 32 using fluidic conduits 75, with the heat sink element 73 mechanically thermally coupled to power transistors of the TPIM 32. A coolant fluid is preferably circulated through the inverter cooling circuit 70 using a fluidic pump. Other fluidic elements such as couplers, reservoirs, pressure regulators and the like may be employed as needed. A temperature sensor 74 is arranged to monitor temperature in the inverter cooling circuit 70, and in one embodiment the temperature sensor 74 monitors temperature of the coolant fluid at an outlet from the TPIM 32. The temperature sensor 74 indicates heat transfer from the heat sink element 73, thus indicating heat generation in the power transistors of the TPIM 32. Alternatively, a temperature model may be employed to dynamically estimate or otherwise determine temperature in the inverter cooling circuit 70, e.g., a temperature of the coolant fluid at the outlet from the TPIM 32, thus indicating heat generation in the power transistors of the TPIM 32. In one embodiment, the air/fluid heat exchanger 72 is part of an overall vehicle cooling system. Alternatively, the TPIM 32 may be air-cooled, with air passively or actively conducted across the heat sink element 73, and with a system to monitor temperature of the air conducted across the heat sink element 73 to indicate temperature of the inverter cooling circuit 70 and thus indicate heat generation in the power transistors of the TPIM 32.

The controller 12 preferably includes a plurality of discrete devices that are co-located with the individual elements of the powertrain system 20 to effect operational control of the individual elements of the powertrain system 20 in response to operator commands and powertrain demands. The controller 12 may also include a control device that provides hierarchical control of other control devices. The controller 12 communicatively connects to each of the high-voltage battery 42, the APM 64 and the TPIM 32 either directly or via a communications bus 16 to monitor and control operation thereof. The controller 12 commands operation of the powertrain system 20, including selecting and commanding operation in one of a plurality of operating modes to generate and transfer torque between the torque generative devices, e.g., the engine 24, the electric machine 30 and the driveline 26. The operating modes may include one or more electric-vehicle (EV) modes wherein the engine 24 is in the OFF state and the electric machine 30 generates propulsion torque. The operating modes may also include an electrically-variable mode wherein the engine 24 and the first electric machine 30 generate propulsion torque. The operating modes may also include an extended-range EV mode wherein the engine 24 is in the ON state and generating electric power through the electric machine 30 and a second electric machine is generating propulsion torque. The extended-range EV mode, the EV mode and the electrically-variable mode each have an associated battery charging mode that may be either a charge-sustaining mode or a charge-depleting mode.

The TPIM 32 is configured with suitable control circuits including power transistors for transforming high-voltage DC electric power to high-voltage AC electric power and transforming high-voltage AC electric power to high-voltage DC electric power. In one embodiment, the TPIM 32 includes a plurality of switch pairs in the form of paired power transistors that are arranged as half-bridges that electrically connect in parallel between HV+ 44 and HV− 46 to supply electric current in multi-phase form to a multi-phase electric load that includes the electric machine 30. Each of the switch pairs corresponds to a phase of the electric machine 30. Gate drive circuits control activation and deactivation of the switches of the switch pairs, and may include any suitable electronic device capable of activating and deactivating the switches to effect power transfer between either HV+ 44 or HV− 46 and a phase of the electric machine 30 in response to control signals originating at the controller 12. The TPIM 32 preferably includes other electrical components including capacitors, resistors and other components to accomplish functions related to electrical noise suppression, load balancing and the like.

The TPIM 32 has a maximum current rating that relates to a maximum device temperature. Operating the TPIM 32 at a current level and related temperature that is greater than the maximum device temperature may impair its function or decrease its service life. One source of heat causing increased device temperature includes switching losses, which relate to electric power that is transformed to heat energy when a power transistor transitions from an open or blocking state to a closed or conducting state and vice-versa.

Known control methods for limiting the inverter temperature include decreasing the current allowed below the rated value i.e., derating the inverter, and decreasing switching frequency. Derating the inverter results in reduced motor torque, which is undesirable because it degrades vehicle performance and is often perceived negatively by the operator. Reducing switching frequency may reduce switching losses in order to limit inverter temperature. However, switching may cause audible noise that is more apparent at some frequencies, so its calibration is often driven by NVH (noise-vibration-harshness) requirements. Also, switching frequency is tied to digital controller sample time, which imposes a lower switching frequency limit that is based on rotational speed of the electric machine 30.

A PWM inverter, e.g., the TPIM 32, may be controlled in one of several different inverter switch control modes, including, e.g., a space vector PWM (SV-PWM) mode and a discontinuous PWM (D-PWM) mode. As used herein, an inverter switch control mode is a term that is used to describe any one of a plurality of techniques, methods and processes for controlling states of the switches of the switch pairs that are arranged as half-bridges in the TPIM 32 to control operation of the electric machine 30 to generate and regulate its torque and speed output. The inverter switch control modes are preferably implemented as control algorithms in the controller 12, and include the SV-PWM mode, the D-PWM mode, and other suitable modes. The SV-PWM mode includes switching rapidly among non-zero states and zero states, with the TPIM 32 specifying what fraction of the time is spent in each of the states for each of the switches by specifying PWM duty cycles. The PWM duty cycles are updated at regular intervals such that the frequency of updates is significantly higher than the frequency of the rotor rotation. The D-PWM Mode is characterized by holding each of the six inverter switches (in a three-phase system) in the on state for a portion of each electrical cycle at the fundamental electrical output frequency. Hence, two of the phase legs will be switched on at any given time during normal operation or one phase will be switched off during times of a high output voltage. The D-PWM mode may include a six-step mode (at its output voltage limit), wherein the TPIM 32 cycles through six non-zero switch states once per cycle of the rotor of the electric machine 30 to produce an AC voltage and current in each winding of the stator of the electric machine 30. Other details related to operating an inverter, e.g., TPIM 32 in the SV-PWM mode and the D-PWM mode are known.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be periodically executed at regular intervals during ongoing operation. Alternatively, routines may be executed in response to occurrence of a triggering event. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The term 'model' refers to a processor-based or processor-executable code and associated calibration that simulates a physical existence of a device or a physical process.

Figure 2:
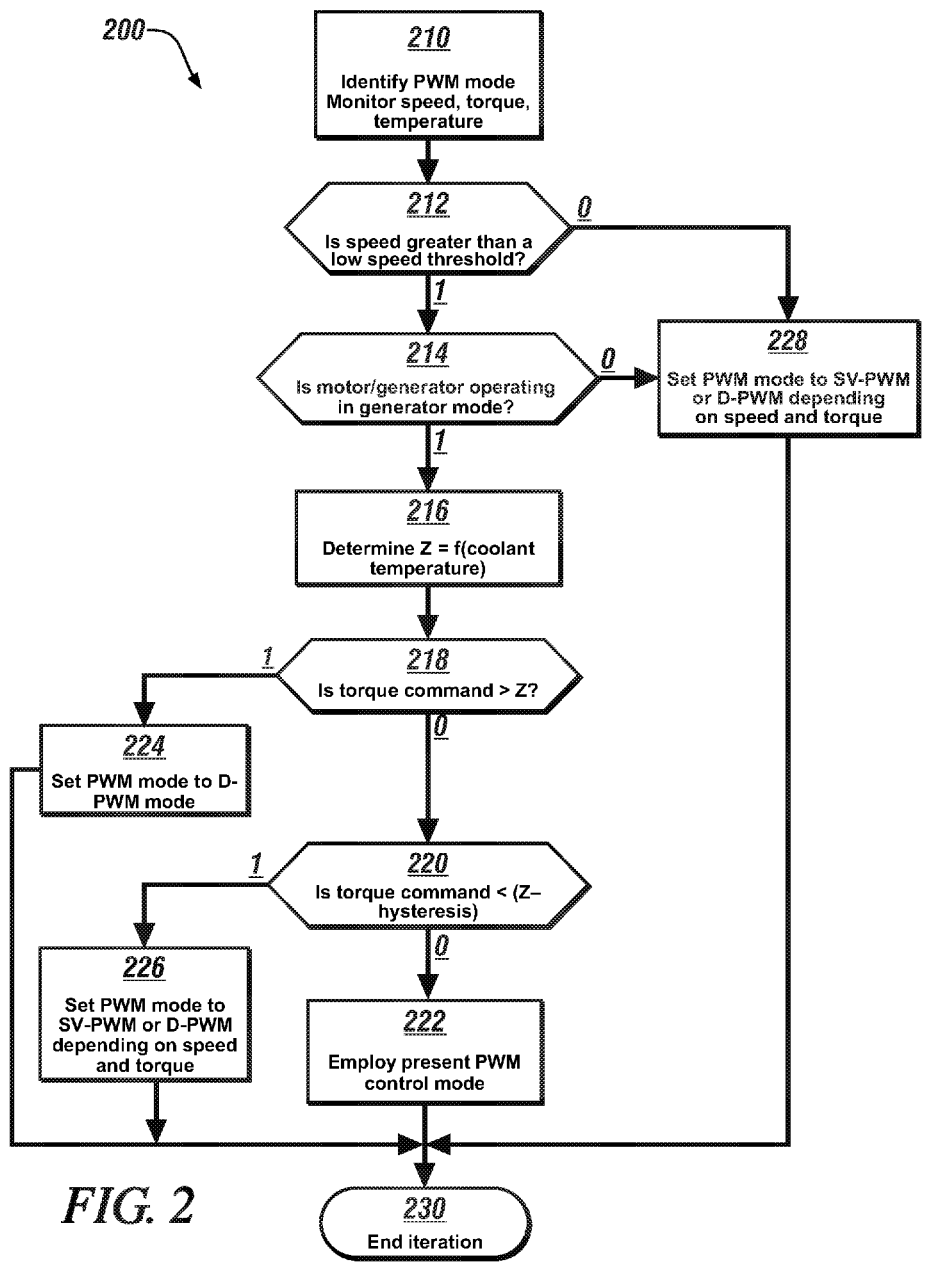
FIG. 2 schematically shows a motor control selection routine for selecting a preferred inverter switch control mode for controlling the inverter based upon a torque output of the electric machine and a temperature of the coolant circulated to the inverter, in accordance with the disclosure.

FIG. 2 schematically shows a motor control selection routine (routine) 200 for controlling an embodiment of the high-voltage electric power system 40 described with reference to FIG. 1. The routine 200 includes selecting a preferred inverter switch control mode for controlling the inverter 32 based upon the torque output of the electric machine 30 and the temperature of the coolant circulated to the inverter 32. Table 1 is provided as a key wherein the numerically labeled blocks and the corresponding functions are set forth as follows, corresponding to the routine 200.

TABLE 1

| BLOCK | BLOCK CONTENTS |
| --- | --- |
| 210 | Identify PWM mode |
|  | Monitor speed, torque, temperature |
| 212 | Is speed greater than a low speed threshold? |
| 214 | Is motor/generator operating in generator mode? |
| 216 | Determine Z = f(coolant temperature) |
| 218 | Is torque command > Z? |
| 220 | Is torque command < (Z − hysteresis) |
| 222 | Employ present PWM control mode |
| 224 | Set PWM mode to D-PWM mode |
| 226 | Set PWM mode to SV-PWM or D-PWM depending on speed and torque |
| 228 | Set PWM mode to SV-PWM or D-PWM depending on speed and torque |
| 230 | End iteration |

The routine 200 executes periodically during operation of the powertrain system to determine a preferred inverter switch control mode based upon rotational speed and torque of the electric machine 20 and the temperature in the inverter cooling circuit 70, which may be indicated by the inverter temperature sensor 74. Initially, the routine 200 identifies the present inverter switch control mode and also determines rotational speed and torque of the electric machine 20 and a temperature of coolant in the inverter cooling circuit 70 that is entering the inverter 32 (210). The rotational speed and torque of the electric machine 20 may be determined by any suitable methods, such as monitoring rotational shaft speed and electrical current flow to the electric machine 20. Alternatively, the routine 200 may monitor or otherwise determine any suitable temperature that directly relates to and indicates temperature in the inverter cooling circuit 70.

When the rotational speed of the electric machine 20 is less than a calibrated threshold speed (212)(0), either the SV-PWM mode or the D-PWM mode is selected, with operation determined based upon the torque and the speed of the electric machine 20 (228). The calibrated threshold speed is determined in order to minimize audible noise when the electric machine 20 accelerates from low speed.

When the rotational speed of the electric machine 20 is greater than the calibrated threshold speed (212)(1), the routine 200 determines whether the electric machine 20 is operating in an electric power generation mode (214), and if so (214)(0), either the SV-PWM mode or the D-PWM mode may be selected, with the selection determined based upon the torque and the speed of the electric machine 20 (228). In one embodiment, it may be optional to determine whether the electric machine 20 is operating in the electric power generating mode or the torque generating mode prior to determining the preferred inverter switch control mode under these conditions.

When the rotational speed of the electric machine 20 is greater than the calibrated threshold speed (212)(1) and the electric machine 20 is operating in a torque generating mode (214)(1), a variable Z is determined in relation the coolant temperature exiting the inverter 32 (216). The variable Z is a parametric value based upon the coolant temperature entering the inverter 32 or another temperature related to the inverter cooling circuit 70, and is described with reference to FIG. 3.

FIG. 3 graphically shows a calibration for the variable Z to select a preferred inverter switch control mode in relation to coolant temperature 310 and motor torque 320. The coolant temperature 310 indicates a temperature of the inverter cooling circuit 70, and may be indicated by a coolant temperature sensor, e.g., sensor 74 described with reference to FIG. 1, or it may be otherwise indicated. The variable Z is indicated by the first line 305 that separates the preferred inverter switch control mode and separates the entire region defined by the coolant temperature 310 and motor torque 320 into a first region 302 and a second region 306 that are separated by a hysteresis region 304 indicated by hysteresis line 303. The first region 302 indicates values for coolant temperature 310 and motor torque 320 that are associated with operation in the SV-PWM mode or the D-PWM mode. The second region 306 indicates values for coolant temperature 310 and motor torque 320 that are associated with operation in the D-PWM mode. As shown, the first line 305 and the hysteresis line 303 have negative slopes. The hysteresis region 304 is introduced to prevent dithering between the SV-PWM mode and the D-PWM mode. The magnitudes of the temperature and torque levels associated with the first separation line 305 are dependent upon the specific thermal properties of the system and are thus application-specific. The magnitudes of the temperature and torque levels associated with the first separation line 305 are set to prevent temperatures in the TPIM 32 from exceeding the maximum device temperature to prevent impaired function or reduced service life. Thus, the routine 200 can use the variable Z indicated by the first separation line 305 or the hysteresis line 303 to determine a maximum allowable torque for operating in the SV-PWM mode based upon the coolant temperature. As such the routine 200 commands operation in the D-PWM mode at lower coolant temperatures when the electric machine 20 is operating at increased torque levels.

Referring again to FIG. 2, the motor torque command is compared with the variable Z that is selected based upon the coolant temperature (218). The compared motor torque command may be based upon a present torque command from the controller, an actual motor torque achieved, a torque associated with commanded current, or a torque associated with a monitored current. When the motor torque command is less than the variable Z torque (218)(0), the motor torque command is compared with the variable Z torque reduced by a hysteresis torque value as indicated by the hysteresis line (220). When the motor torque command is greater than the variable Z reduced by the hysteresis torque value (220)(0), the present inverter switch control mode continues to be the preferred inverter switch control mode (222). When the motor torque command is less than the variable Z torque reduced by the hysteresis torque value (220)(1), the SV-PWM mode or the D-PWM mode becomes the preferred inverter switch control mode (226). When the motor torque command is greater than the variable Z torque (218)(1), the D-PWM mode becomes the preferred inverter switch control mode (224). When the preferred inverter switch control mode is selected for implementation, this iteration of the routine ends (230).

The concepts described herein allows for the use of D-PWM under motor operating conditions that are likely to result in the inverter temperature exceeding a limit, while permitting the use of other PWM methods, e.g., SV-PWM under other less severe conditions. From an NVH perspective, this allows D-PWM only when conditions for high temperature are present, rather than at all times. This method retains full current and torque capabilities under such conditions, unlike an algorithm that derates one or the other. This provides consistent performance for the operator over a broad range of temperature, torque and speed conditions.

Furthermore, the routine 200 may serve to pre-empt a high inverter temperature condition. This is in contrast to a control routine that selects a PWM method based on inverter temperature sensor data, which may be unable to react quickly enough to prevent switch overheating due to the inherent time lag between switch temperature and sensed temperature.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for controlling switching in an inverter electrically connected to an electric machine, the method comprising:
   determining a torque output of the electric machine;
   determining a temperature related to an inverter cooling circuit; and
   when a rotational speed of the electric machine is greater than a minimum threshold speed,
   selecting a preferred inverter switch control mode for controlling the inverter based upon the torque output of the electric machine and the temperature related to the inverter cooling circuit, including selecting a space-vector PWM inverter switch control mode only when the temperature related to the inverter cooling circuit is less than a threshold temperature, wherein the threshold temperature is determined based upon the torque output, and wherein the threshold temperature decreases with an increase in the torque output.

2. The method of claim 1, wherein selecting the preferred inverter switch control mode for controlling the inverter based upon the torque output of the electric machine and the temperature related to the inverter cooling circuit comprises selecting a discontinuous PWM mode when the temperature related to the inverter cooling circuit is greater than the threshold temperature.

3. The method of claim 1, further comprising selecting the space-vector PWM mode when the rotational speed of the electric machine is less than the minimum threshold speed.

4. A powertrain system for supplying propulsion power to a driveline, comprising:
an electric machine electrically connected to a multi-phase inverter that is operatively connected to a controller;
the multi-phase inverter including an inverter cooling circuit;
the controller including algorithmic code for controlling the multi-phase inverter to transfer electric power to the electric machine, the code executable to:
determine a torque output of the electric machine,
determine a temperature related to the inverter cooling circuit, and
when a rotational speed of the electric machine is greater than a minimum threshold speed,
select a preferred inverter switch control mode to control the multi-phase inverter based upon the torque output of the electric machine and the temperature related to the inverter cooling circuit, including code executable to select a space-vector PWM inverter switch control mode only when the temperature related to the inverter cooling circuit is less than a threshold temperature, wherein the threshold temperature is determined based upon the torque output, and wherein the threshold temperature decreases with an increase in the torque output.

5. The powertrain system of claim 4, further comprising code executable to select a discontinuous PWM mode as a preferred inverter switch control mode to control the multi-phase inverter when the temperature related to the inverter cooling circuit is greater than the threshold temperature.

6. The powertrain system of claim 5, further comprising:
a temperature sensor configured to monitor the inverter cooling circuit; and wherein the code to determine the temperature related to the inverter cooling circuit comprises code to monitor a signal output from the temperature sensor to determine the temperature related to the inverter cooling circuit.

7. The powertrain system of claim 4, further comprising an internal combustion engine mechanically rotatably coupled to the electric machine supply propulsion power to the driveline.

8. The powertrain system of claim 6, further comprising an internal combustion engine mechanically rotatably coupled to the electric machine via a gear train to supply propulsion power to the driveline.

9. The method of claim 1, wherein the threshold temperature is determined based upon the torque output and a hysteresis torque value.

10. The powertrain system of claim 4, wherein the threshold temperature is determined based upon the torque output and a hysteresis torque value.

* * * * *